Figure 1:
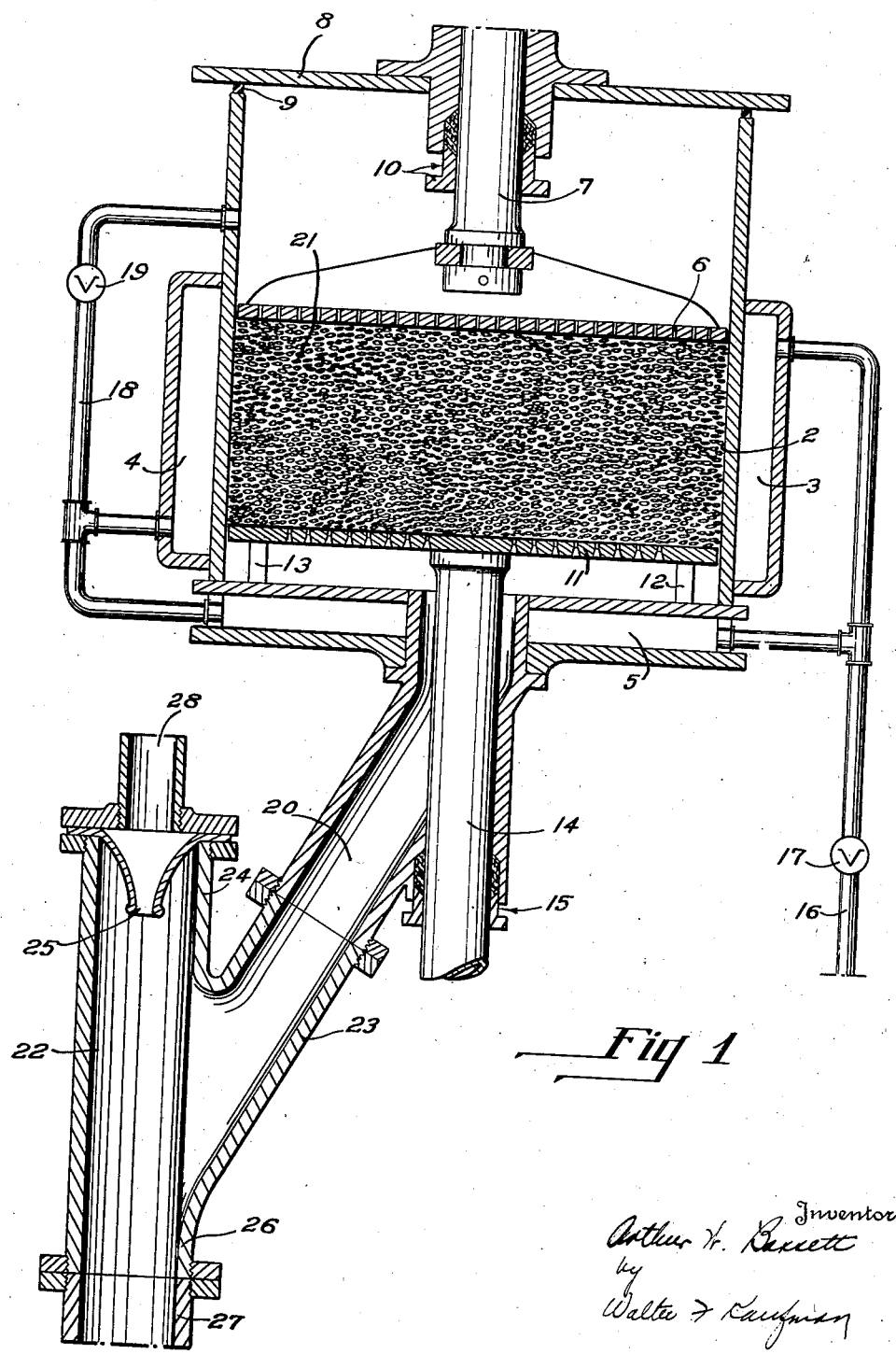

July 29, 1941.                A. W. BASSETT                2,250,697
           METHOD AND APPARATUS FOR THE MANUFACTURE OF CORK ARTICLES
                    Filed July 14, 1939            2 Sheets-Sheet 1

July 29, 1941.　　　　A. W. BASSETT　　　　2,250,697
METHOD AND APPARATUS FOR THE MANUFACTURE OF CORK ARTICLES
Filed July 14, 1939　　　2 Sheets-Sheet 2

Patented July 29, 1941

2,250,697

UNITED STATES PATENT OFFICE 2,250,697

METHOD AND APPARATUS FOR THE MANUFACTURE OF CORK ARTICLES

Arthur W. Bassett, Lancaster, Pa., assignor to Armstrong Cork Company, Lancaster, Pa., a corporation of Pennsylvania Application July 14, 1939, Serial No. 284,563

10 Claims. (Cl. 18—1)

This invention relates to the manufacture of cork articles such as corkboard insulation and cork pipe and fitting covers. The invention is concerned particularly with the manufacture of such articles by the so-called "steam bake" process.

In the steam bake process, the particles of natural cork are heated by direct contact with steam, preferably superheated, and such heating is effective for liberating the resins which occur naturally between and around the cell walls of which the cork granules are constituted, such liberated natural resins together with the mechanical interlocking of the particles serving to join the individual cork granules into a more or less homogeneous, porous body—no extraneous binder or cementing agent being required.

In the most commonly employed steam bake process, the cork granules are charged into a mold and are placed under compression between perforate upper and lower mold plates. Superheated steam is passed through the confined mass and serves to liquefy the resinous material, disposed as nature's cementing medium between the cell walls of the cork, and to some extent volatilize the fractions having a relatively low vaporization point. As heating progresses, the liquefied resin is distributed over the cork granules and due to the softening and expanding effect caused by heating of the cork, the granules are brought into closer contact, filling or reducing the void space in the mass and inducing expansion and mechanical interlocking of the particles, the liberated resin disposed between adjacent contacting cork surfaces serving to bind such particles together. Whereupon, the passage of steam through the mass is discontinued and the completed article removed from the mold.

In a modified steam bake process, the cork particles are charged into a mold and heated by passage of steam therethrough, there being no precompression of the granules, the only compression resulting from expansion of the granules into engagement with the perforate top and bottom mold plates which are employed. After completion of the steaming step, the mass is compressed into final shape and allowed to cool in the mold or is subjected to additional heating by oven baking to complete the binding action and after cooling in the mold is subsequently discharged therefrom.

Other modified steam bake processes have been heretofore described and some have been commercially utilized.

In all species of the steam bake processes, there are at least three fundamental problems:

1. The liberated resins, at least the more readily vaporizable fractions, are carried out of mass by the exhaust steam and congeal upon the surfaces of the exhaust system causing the size of the exhaust passages to be gradually diminished. The deposited resins are of such character that they can be removed from the tubes only by burning. This requires dismantling of the tubes and concomitant downtime of the equipment—an expensive operation.

2. The resins are readily combustible and dangerous fires have occurred in the exhaust stacks.

3. Odor emanating from the exhaust stack is obnoxious and the smoke created by carbonization and volatilization of the resins and cork is objectionable and aggravated by practice of the steam bake process.

It is the primary purpose of this invention to overcome the problems above recited and, in their solution, to provide an improved method and apparatus for carrying out the steam bake method, the practice of which will reduce the baking time, and the steam required, and will produce articles of more uniform character throughout.

According to this invention the exhaust steam passing from the mold is directed immediately into a congealing spray of liquid which is effective for immediately congealing the resins carried in the steam. A relatively large volume of liquid is employed so that the resulting product consists of finely divided solid resin particles of minute size suspended or dispersed in a large volume of liquid. Water is preferably used as the congealing liquid and accordingly the exhausted mixture is noninflammable. The resins being of a thermoplastic character are instantaneously hardened upon coming within the zone of the congealing spray and no longer adhere to the exhaust tubes. The noxious odors ordinarily encountered by practice of the steam bake process are not present. Thus this process overcomes all of the fundamental objections to the steam bake process as heretofore carried out.

Additional advantages may be obtained by providing apparatus effective with the liquid spray to perform the function of a condenser. By directing the spray into a relatively long vertical exhaust tube this effect may be obtained and results in reduction of pressure within the molding chamber which is conducive to rapid passage of the steam through the cork mass, permitting the use of lower steam pressure at the inlet end of the mold and materially reducing the duration of steam treatment. Less steam is therefore required to produce a final product completely baked and bonded throughout its entire thickness. Exhaust fans placed in the steam line have been heretofore suggested for this purpose but they soon became clogged with deposited resins and are not effective for producing any great negative pressure within the mold. The reduction of pressure incidental to the use of high exhaust stacks or chimneys with natural draft is not sufficiently great as to be noticeable.

Figure 2:
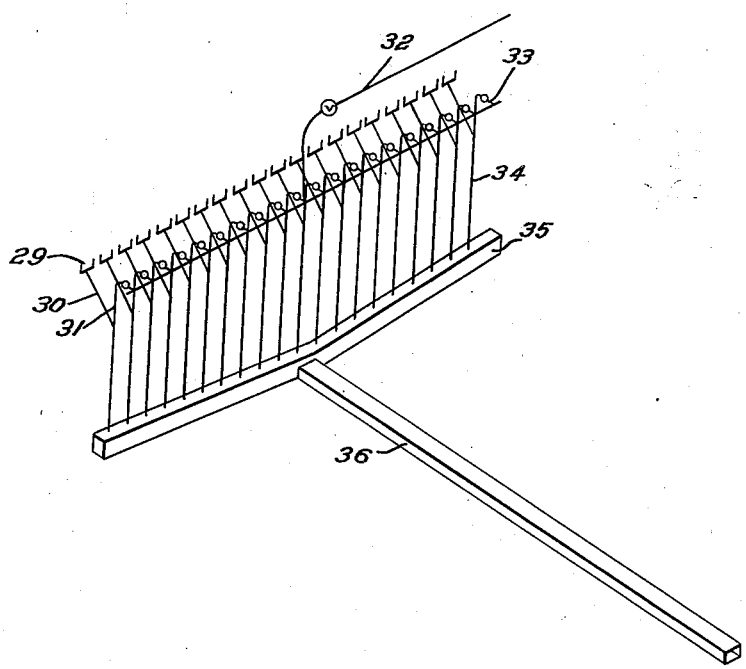

In order that the invention may be conveniently described, reference will be made to the drawings, in which Figure 1 is a transverse sectional view, of more or less diagrammatic character, showing a single corkboard mold incorporating the exhausting equipment, and Figure 2 is a schematic view illustrating the invention applied to a battery of twenty molds.

Referring to Figure 1, there is shown a conventional corkboard mold including a molding chamber 2, provided with external heating jackets 3 and 4 on the sides and a similar jacket 5 at the bottom. An upper perforate mold plate 6 is attached to a hydraulic ram 7 effective for moving the plate 6 into position. A fluid tight cover 8 is provided for the molding cavity 2, the same being sealed by a gasket 9 disposed between the cover and the walls of the mold cavity. A sliding fluid tight connection is provided between the ram 7 and the cover 8 by the packing gland 10. A lower perforate mold plate 11 is provided which is spaced from the bottom wall of the mold cavity 2 by spacer blocks 12 and 13. The lower mold plate 11 is carried by an ejector 14 effective for elevating the lower mold plate 11 to facilitate removal of the completed article from the mold. A sliding, fluid tight connection is made between the plunger 14 and the body of the mold by a packing gland 15.

In the embodiment shown in Figure 1, a steam line 16, controlled by a gate valve 17, is provided and communicates through pipes to jackets 3, 4 and 5. A steam line 18, controlled by a gate valve 19, communicates steam into the molding chamber 2, above the upper mold plate 6 when the same is in lowered position, with the cork granules under compression therebetween, as shown. An exhaust conduit 20 is disposed in communication with the chamber formed below the lower mold plate 11. In this mechanism, the steam is introduced from line 16 into the steam jackets 3, 4 and 5 surrounding the molding cavity 2 and thence through line 18 into the molding cavity, through the mass of cork particles 21 confined between the plates 6 and 11, passing through the distribution openings in each and into the exhaust conduit 20.

The mechanism just described is of conventional form for the practice of the steam bake process wherein the cork is precompressed to final shape prior to passage of the steam therethrough and is illustrative of one of the various mold arrangements for carrying out the steam bake process.

Connected as closely as possible to the conduit 20 is a pipe lateral 22, one branch 23 of which communicates directly with the conduit 20 and the other branch 24 of which contains a nozzle 25 effective for directing a spray of water in substantial volume into the zone of exhaust steam passing into the exhaust end 26 of the lateral. If a condenser action is desired—and it is advantageous and readily attainable—a vertical tube 27 is connected to the exhaust end 26 of the lateral. Water is fed to the nozzle 25 from a suitable source, not shown, through a pipe line 28, connected to properly direct the liquid into the nozzle 25.

The mode of operation of the process will be briefly described in conjunction with the precompression species of the steam bake method, using the apparatus of Figure 1:

Assuming that the molding chamber 2 is of such size as to produce a final product of about 13″x37″x34″, having a density of about .6 pound per board foot, the lid 8 and top perforated mold plate 6 are elevated and a charge of about 45 pounds of granulated cork, say of ⅛″ to ¾″ mesh, is charged into the molding chamber onto the lower mold plate 11. The mold cavity is preferably preheated by admission of steam into the jackets. The upper mold plate 6 is next lowered into engagement with the cork granules and compression is applied by the ram 7 to the granules disposed between the plates 6 and 11 until the volume of cork as initially disposed in the molding chamber 2 is reduced by about one-half. The cover 8 is then placed in sealed position and superheated steam at about 525° F. and 25# per square inch gauge is introduced into the mold chamber through pipe line 18, the valve 19 being used to control the flow of steam to about 600 pounds per hour. The steam passes through the perforations in the upper mold plate 6, through the mass of cork granules 21, liberating the natural resins therein, and passes, as a resin laden fluid, through the perforations in the lower mold plate 11 into the exhaust chamber and conduit 20. The steam and resins as they leave the mold are at a temperature of about 440° F.

Water is fed to the lateral or condenser at a rate which depends to some extent upon its temperature, and the degree of negative pressure, if any, desired in the mold. With water at 70° F., and with the conditions above described, a volume of about 50 gallons per minute through a ¾″ nozzle is satisfactory for each mold and will create a desirable pressure reduction therein when using a 20 foot vertical condenser. Such quantity of water will properly congeal and convey the resinous material to a suitable disposal basin. The resin laden steam is condensed immediately upon admixture with the spray from nozzle 25 and the resins are precipitated as relatively small particles, suspended in the water. The mixture is of a milky color and is nonadhesive to the walls of the conductors. It is incombustible and has no obnoxious odor. Likewise any smoke resulting from volatilization of the resins or carbonization of the cork or its resins is eliminated.

The resin suspension may be filtered and the resins recovered for further use if desired or the waste water otherwise disposed of. The system may conveniently include an exhaust basin or reservoir where the water may be cleaned, cooled and reused.

It will be obvious that the practice of the present invention may be advantageously employed in any species of the steam bake process without major change to existing equipment and the problems heretofore encountered will be completely obviated. In addition, by this process certain other manufacturing economies may be effected. For example, with the precompression species of the steam bake method, it is possible to reduce the steam baking time by about 20% and where a 15 minute baking cycle was heretofore required a 12 minute cycle now suffices. There is also a reduction in the volume of steam passing through the mold and by the creation of reduced pressure in the mold it is possible to reduce the initial steam pressure to a minimum thus permitting the manufacture of a greater amount of by-product power with the same generating equipment. Also, the resins which normally are a detriment to continued use of the molding equipment may now be recovered for further use.

It is here pointed out that the degree of vacuum obtainable depends to some extent upon the pressure of water fed through the condenser, but the economy of operation of the process must be determined by balancing the savings available by the use of a condenser with the cost of supplying the water to the condenser.

In Figure 2, there is disclosed diagrammatically the method and apparatus of this invention applied to a battery of 20 molds. Here, the molds 29 are individually connected by exhaust lines 30 with laterals 31. Water is fed to individual nozzles in the laterals from a common supply line 32, through connecting pipes 33, each of which is provided with a gate valve to control the flow of water. Each lateral 31 is provided with a condenser tube 34, the condenser tubes discharging into a common duct 35 from which the exhausted water is conveyed by a similar duct 36 to a reclamation basin or disposal point.

With such a system any number or all of the molds may be independently operated conveniently.

The above described method and apparatus have been designed particularly for use with the precompression species of steam bake method, as heretofore made clear, and modification of such method and apparatus may be conveniently effected to meet the requirements of other species by those skilled in the art from the principles enumerated and described in this specification.

While there has been illustrated and described certain preferred embodiments of this invention, the same is not limited thereto and may be otherwise embodied and practiced within the scope of the following claims:

I claim:

1. The method of forming cork articles from particles of natural cork joined by the natural resin of the cork comprising charging the cork particles into a mold, passing steam through the mass of cork particles to liberate the natural resin of the cork and expand the particles, and exhausting said steam and the volatile resin carried thereby into a spray of liquid effective to congeal the resin suspended in the steam.

2. The method of forming cork articles from particles of natural cork joined by the natural resin of the cork comprising charging the cork particles into a mold, passing superheated steam through the mass of cork particles to liberate the natural resins of the cork and volatilize a portion thereof and expand the particles, and exhausting said steam and the resin suspended therein into a spray of water to congeal the resin and render the same nonadhesive to the surfaces of the exhausting equipment.

3. The method of forming cork articles from particles of natural cork joined by the natural resin of the cork and mechanical interlocking of the particles comprising charging the cork particles into a molding chamber, passing steam through the mass of cork particles while maintaining a negative pressure within said chamber, liberating the natural resin of the cork, and exhausting the steam and resin suspended therein into a water spray condenser to congeal the resin and convey the same away from the molding chamber.

4. The method of forming cork articles from particles of natural cork joined by the natural resin of cork comprising charging cork particles into a molding chamber, compressing said particles while passing steam therethrough under pressure, creating a zone of reduced pressure in the molding chamber, continuing the passage of steam therethrough under such conditions until the resin of the cork is liberated and the particles expanded and continuously exhausting said steam and the volatile resin suspended therein into a water spray effective for congealing the resin and establishing said zone of reduced pressure.

5. The method of forming cork articles from particles of natural cork comprising charging particles of cork into a molding chamber, passing steam through said mass of cork particles to liberate the natural resin therein while exhausting steam which has passed through said particles into a water spray condenser to produce a negative pressure in the molding chamber and congeal the resin removed from the cork particles by the steam treatment and convey the same away from the molding chamber.

6. The method of reclaiming resin from natural cork comprising passing superheated steam through a mass of comminuted natural cork to liberate the resin therein and volatilize a portion at least thereof, condensing the steam after passage through said mass by bringing the same into the path of a spray of water and separating the congealed resin from the water.

7. In an apparatus for the manufacture of cork articles the combination of a molding chamber for the reception of cork particles to be treated, an injector for directing steam into said mass, a conduit for exhausting steam from the molding chamber, and means for directing a spray of congealing liquid into the exhausting steam at a point adjacent its exit from the molding chamber.

8. In an apparatus for the manufacture of cork articles, a molding chamber for the reception of cork particles to be treated, an injector for introducing steam into the molding chamber, a conduit for steam exhausted from the molding chamber, a lateral closely coupled to the exhaust conduit, one branch of the lateral being connected to the exhaust conduit and the other branch thereof including a nozzle for directing liquid under pressure toward the intersection of said branches, and a condenser tube connected to the exhaust end of said lateral.

9. In an apparatus for the manufacture of cork articles, a molding chamber adapted to receive cork particles to be treated, means for applying compression to cork granules disposed in said molding chamber, means for passing steam through the mass of cork particles within the molding chamber, an exhaust tube for the reception of exhaust steam from the molding chamber, and a water spray condenser closely coupled to said exhaust tube.

10. The method of forming cork articles from particles of cork joined by the natural resinous material of the cork comprising charging cork particles into a mold, passing superheated steam through the mass of cork particles in the mold to vaporize the natural resinous material, exhausting said steam and resin vapor immediately into a water spray condenser while the resin is still in a vaporized condition, and condensing said steam and resin vapor to create a zone of reduced pressure at the exhaust end of the mold to facilitate passage of steam through the cork mass as baking continues.

ARTHUR W. BASSETT.